United States Patent
Kubota et al.

(10) Patent No.: US 6,443,077 B1
(45) Date of Patent: Sep. 3, 2002

(54) SYSTEM FOR PRODUCING COMBUSTION ASH OF CELLULOSE-CONTAINING WASTES

(75) Inventors: Makoto Kubota; Tutomu Domoto, both of Fuji (JP)

(73) Assignee: Kubota Co., Ltd., Shizuoka (JP)

( * ) Notice: Subject to any disclaimer, the term of this patent is extended or adjusted under 35 U.S.C. 154(b) by 38 days.

(21) Appl. No.: 09/903,288

(22) Filed: Jul. 11, 2001

(30) Foreign Application Priority Data

Jul. 14, 2000 (JP) ........................................ 2000-214027

(51) Int. Cl.[7] .............................. F23G 5/04; C10L 5/06
(52) U.S. Cl. ...................... 110/224; 110/223; 110/219; 110/234; 110/238; 110/342; 44/594
(58) Field of Search ................................ 110/218, 219, 110/223, 224, 225, 233, 234, 238, 342, 346; 44/550, 551, 553, 594, 597

(56) References Cited

U.S. PATENT DOCUMENTS

| | | | |
|---|---|---|---|
| 2,102,427 A | * | 12/1937 | Loyd et al. |
| 3,109,392 A | * | 11/1963 | Riepl et al. |
| 3,218,995 A | * | 11/1965 | Akira |
| 3,592,617 A | * | 7/1971 | Alpan et al. |
| 4,078,902 A | * | 3/1978 | Olson |
| 4,178,215 A | * | 12/1979 | Kiritani et al. |
| 4,388,875 A | * | 6/1983 | Hirose |
| 4,409,909 A | * | 10/1983 | Tomizawa et al. |
| 4,561,860 A | * | 12/1985 | Gulley et al. |
| 4,615,711 A | * | 10/1986 | Muller |
| 4,650,546 A | * | 3/1987 | Le Jeune |
| 5,035,189 A | * | 7/1991 | Lunsford |
| 5,080,026 A | * | 1/1992 | Tsunemi et al. |
| 5,282,431 A | * | 2/1994 | Kiss |
| 5,630,366 A | * | 5/1997 | Lesoille |
| 6,196,144 B1 | * | 3/2001 | Kiss |

FOREIGN PATENT DOCUMENTS

JP 408219430 A * 8/1996

* cited by examiner

Primary Examiner—Denise L. Esquivel
Assistant Examiner—K. B. Rinehart
(74) Attorney, Agent, or Firm—Koda & Androlia

(57) ABSTRACT

The system for producing combustion ash of cellulose-containing wastes, provided with a kneading device 3 for kneading cellulose-containing wastes with a prescribed amount of liquid fuel oil, a molding device 5 for molding said kneaded mixture, and a combustion furnace 7 for burning said moldings, is characterized in that the humidity conditioning furnace 6 for adjusting the water content of said moldings is arranged between said molding device and said combustion furnace.

Since the water content of said moldings is adjusted by the humidity conditioning furnace at the time of burning said moldings, the organic substances (cellulose or the like) are burned almost perfectly. Consequently, the present invention has the advantage of being able to produce combustion ash of good quality without generating such combustion residue as graphite and black smoke.

9 Claims, 1 Drawing Sheet

SYSTEM FOR PRODUCING COMBUSTION ASH OF CELLULOSE-CONTAINING WASTES

BACKGROUND OF THE INVENTION

1. Field of the Invention

The purpose of the present invention is to provide a system for producing combustion ash of cellulose-containing wastes, and more in details, to provide a system for efficiently producing the combustion ash of cellulose-containing wastes and also minimizing generation of unburned combustibles such as graphite and black smoke.

2. Prior Art and Problems

Conventionally, wastes cellulose containing cellulose (what is called paper sludge) has been known as wastes discharged from a paper mill. Such paper sludge has conventionally been dehydrated, dried, and incinerated, and the ash portion has been abandoned in an industrial wastes final disposal site.

However, the wastes of these substances is rapidly increased in volume, so industrial wastes final disposal sites are becoming full, and further, it has been disadvantageous that the wastes relates to a large sum of expenses.

Therefore, the applicants of the present invention have developed a combustion method of cellulose-containing wastes for kneading said cellulose-containing wastes with the liquid fuel oil to mold a kneaded mixture, and thereafter, for burning said kneaded mixture (U.S. Pat. No. 2,938,362). According to this method, it is possible to excellently incinerate the cellulose-containing wastes without drying the wastes, and moreover, it has been found out that the combustion ash, i.e., the molded combustion residue, is usable as well as minerals such as vermiculite and pearlite, and for example, it is widely applicable as soil for gardening, a heat insulating material of melting iron, a light-weight block material, or the like.

The purpose of the present invention is to provide a system for producing the above-described combustion ash more efficiently and without letting unburned residue remain as far as possible,.

SUMMARY OF THE INVENTION

In order to solve the above problems, the system for producing combustion ash of cellulose-containing wastes in accordance with the present invention, which is provided with the kneading device for kneading the cellulose-containing wastes with a given quantity of liquid fuel oil, the fuel tank for storing said fuel oil and supplying the fuel oil to said kneading device, the molding device for molding said kneaded mixture, and the combustion furnace for burning said moldings, is characterized in that the humidity conditioning furnace for adjusting the water content of said moldings is arranged between said molding device and said combustion furnace. According to the present invention, the paper sludge is formed into moldable paste by adding a given quantity of liquid fuel oil while kneading it, and further kneading the paper sludge, and also since said paste is formed into a prescribed form, for example, like a form of a bar and the water content of said moldings is adjusted by the humidity conditioning furnace at the time of burning said moldings, the organic substances (cellulose or the like) are burned almost perfectly. Consequently, the present invention has the advantage of being able to produce combustion ash of good quality without generating such combustion residue as graphite and black smoke.

DETAILED DESCRIPTION OF THE INVENTION

Figure 1:
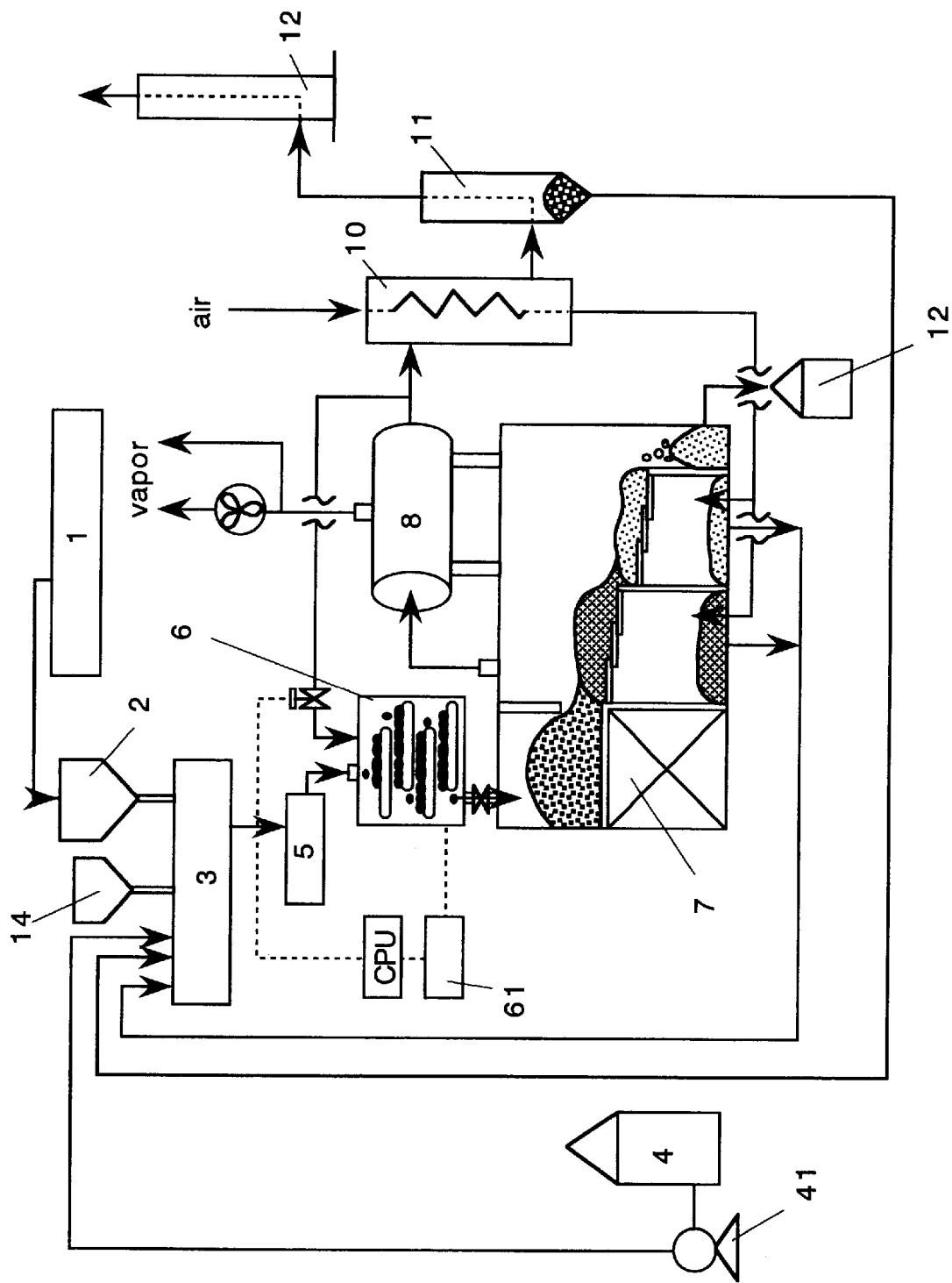
FIG. 1: A schematic drawing of a device for producing the combustion ash of the cellulose-containing wastes in accordance with the present invention.

FIG. 1 relates to the combustion system of paper sludge, and a prescribed amount of the paper sludge discharged from the paper manufacture plant 1 is supplied to the kneading device 3 by a hopper 2. On the other hand, a prescribed amount of the fuel oil is continuously supplied from a fuel oil tank 4 by a pump 41 or the like. Then, it is dropped and added to the kneaded paper sludge to be mixed.

Since kaolin, talc, calcium oxide, calcium carbonate, etc. are added to paper, in addition to the cellulose as an organic substance it is known that, the above-mentioned paper sludge contains inorganic matters like silica, alumina, calcium oxide, magnesium oxide as chemical composition. It is preferable that the paper sludge to be utilized in the present invention as described above contains 97–35 wt % said cellulose and 3–65 wt. % said inorganic matters to the whole solid as 100% (cellulose +inorganic matters). The reason is that when the cellulose portion exceeds 97 wt. % (the inorganic matters are less than 3 wt %), it becomes difficult to mold the kneaded mixture, and when the cellulose portion is less than 35 wt % (the inorganic matters exceed 65 wt. %), the paper sludge is reduced in its tendency to burn. It is most preferable that the whole solid contains 40–60 wt. % inorganic matters.

As stated above, the paper sludge is kneaded with the fuel oil, and this fuel oil is added in a liquid state. It is preferable to perform the kneading at a normal temperature, however, the mixture rises in temperature in said mixer due to kneading. Therefore, a liquid state fuel oil at the above-stated kneading temperature is preferred. Namely, it is recommended to use such a fuel oil as is liquid at temperatures of 10–80° C., preferably, liquid at a normal temperature up to 60° C. (this corresponds to kinematic viscosity which will be described later). Moreover, it is preferred that the kinematic viscosity of the fuel oil is 50 cSt and less than 170 cSt at 50° C. (Japanese Industrial Standards). When the kinematic viscosity is less than 50 cSt, the kneaded mixture is difficult to form, and when it is not less 170 cSt, it is necessary to heat the fuel oil up to a high temperature to bring the fuel oil to be liquid, and this is not recommended because the operational control of the system and the quality control of the fuel oil become complex.

As fuel oils as stated above, one or more kinds of oils such as heavy fuel oils A, B, C, tempura oil, and wastes machine oil can be used. Especially, it is advantageous in the present invention that low sulfur C-type heavy oil can be used; a discharge amount of 50can be reduced at the time of burning the paper sludge by using the low sulfur C-type heavy oil; therefore, this eliminates the need for a desulphurization equipment for combustion.

Concerning a weight ratio of the paper sludge to the fuel oil as stated above, it is preferred that a ratio of fuel oil to solids content of paper sludge is 1:1.5–1:1.9. The reasons are that when the weight ratio is smaller than 1 to 1.5, the kneaded mixture is difficult to form, and when the ratio exceeds 1.9 on the other hand, the kneaded mixture becomes hard to burn and ignite. A weight ratio between 1:1.2 and 1:3.5 is most preferable.

After the paper sludge has been kneaded in said kneading device 3 as stated above, it is transferred to a briquetter (a molding device) and formed into briquettes (moldings). The paper sludge is thus made into briquettes, and thereafter, they are automatically transported into the combustion furnace 7 by a carrier system like, for example, a conveyer or the like. Then, said briquettes pass through the humidity conditioning furnace 6.

The water content of the paper sludge discharged from this paper manufacturing plant 1 is 50–75 wt % of the whole paper sludge, approximately 65 wt % on average. As will be obvious from the embodiment described later, it is necessary to control the water content to 30–50 wt. % for minimizing the combustion residue like soot particles or the like. In the present invention, the above-mentioned water content is controlled by the humidity conditioning furnace 6 for controlling such water content.

The briquettes of the kneaded paper sludge rise in temperature while being kneaded in the kneading device 3, and it is obvious that even if some water content is removed from them, they basically have an excessive water content than the above-mentioned optimal water content in many cases. Therefore, according to the present invention, the water content of the briquettes is periodically measured by a temperature sensor 61 arranged in the humidity conditioning furnace 6, and the temperature is controlled by processing the measured data by a CPU and keeping an air flow rate for the humidity conditioning furnace 6. Basically, the temperature control of this humidity conditioning furnace 6 may be performed by any method, for example, it is possible to heat up the humidity conditioning furnace 6 by sending the exhaust gas from the later-described combustion furnace 7 into the humidity conditioning furnace. In this case, the temperature of the humidity conditioning furnace 6 can be controlled by controlling a flow rate of said discharge gas.

Preferably, the temperature of this humidity conditioning furnace 6 is controlled to be at 150–250° C. When it is lower than 150° C., the water content of the briquettes is in danger of being not adjustable to 30–50 wt %, and on the other hand, when it exceeds 350° C., this causes such disadvantages as the oil content in the briquettes may evaporate and also the briquettes may ignite.

Also, a transit time for the briquettes to pass through the humidity conditioning furnace 6 is preferably 3–5 minutes. When it is shorter than 3 minutes, the water content of the briquettes are in danger of being not adjustable to 30–50 wt %, and on the other hand, when it is longer than 10 minutes, the equipment of the humidity conditioning furnace 6 have to be too large and is not practical.

The briquettes thus adjusted in water content are to be arranged so as to be continuously fed into the combustion furnace 7. The combustion furnace 7 is provided with a boiler 8, and the steam generated by this boiler 8 is supplied to a power generating turbine 9 to be used for generating electric power and is reused as a part of a energy source for the factory.

On the other hand, after the heat utilization in the boiler, the exhaust gas is partly used for heating the humidity conditioning furnace 6, and is also used for heat-exchange between an air pre-heater 10 and primary air (air to be supplied to the combustion furnace 7), and exhausted from a chimney 12 via a dust arrester 11 (desulphurization equipment can also be also provided).

The combustion ash is stored in a posterior part of the combustion furnace and taken out of there. Unburned combustibles fall on the bottom under the floor of the combustion furnace 7 and accumulated thereon. Such unburned combustibles are generated by 0.1–3 wt. % based on the briquettes (solid fuel) as a reference, and can be returned to the kneading device 3. Thus, by returning the unburned combustibles to the kneading device 3, the unburned combustibles are not handled as wastess, but the briquettes are increased in ignitability and improved in a combustion efficiency, and moreover, the unburned combustibles have little water content and are heated at a high temperature, therefore, they have the advantage of decreasing the water content of the kneaded mixture as a fuel.

In such a manner, the water content of the paper sludge can be adjusted to almost an ideal state by the humidity conditioning furnace 6 and addition of the unburned combustibles to the kneading device 3, however, when the paper sludge has a very large water content, excellent combustion ash can be produced by putting, for example, a calcium compound such as slaked lime and calcium carbonate into the kneading device 3 from a calcium compound tank 14 for decreasing the water content.

Such a system has the advantages of being operated almost automatically and also continuously, and allowing a paper mill to save energy thereof by being combined with the paper mill, and further, permitting to effectively burn the paper sludge. Thus, the organic substances (cellulose or the like) in the paper sludge are burnt almost perfectly. Therefore, this system has the advantage of producing combustion ash of good quality without generating combustion residue such as graphite and black smoke. An embodiment in accordance with the present invention will be described in the following.

EXAMPLE

Paper sludge composed of a water content of 60 wt. % and a solids content of 40 wt. %(consisting of 50% cellulose and 50% inorganic matters by weight) was kneaded for 5 minutes in a Banbury mixer. Next, the kneading was continued so that a ratio of the fuel oil to the paper sludge solids content becomes equal to 1:2 while gradually adding low sulfur C-type heavy fuel oil to the paper sludge for 20 minutes.

The kneaded mixture obtained were molded into briquettes of a 15 mm diameter and a 50 mm length, and they were heated for 3 minutes in the humidity conditioning furnace controlled at 250° C. to adjust their water content to about 41 wt. %, and thereafter, they were thrown into the combustion furnace for burning.

It has been found that the briquettes can produce approximately 2000 kcal/kg combustion energy, and that they are usable as a fuel. Moreover, the combustion residue is almost white, and it has been found that the combustion residue has a composition of 17.1% CaO, 43.2% $SiO_2$, 25.7% $Al_2O_3$, 10.2% MgO, 0.99% $Fe_2O_3$ (each compound is expressed in weight percent), and 0.06 wt % unburned combustibles, and that the briquettes were burnt almost perfectly.

This combustion residue consists of porous gravel-like or sand-like white-gray inorganic matters, and has a small content of unburned combustibles (3–5 wt % in the case of the conventional dry combustion), and it has been found that it is alkaline with the pH about 12, and that it is usable as a soil conditioner or a soil stabilizer because it is porous and excellent in water-absorbing property, hydrophilicity, or the like.

Next, flammability test was carried out by varying water content of said briquettes (moldings). The quality of the flammability was judged by checking such items as flame hue, the presence or absence of generating black smoke (soot), a combustion rate, or the like. The results are shown in the table below.

TABLE

| Water content: | 10–25 | 25–35 | 35–43 | 43–50 | 50–60 | 60–75 |
|---|---|---|---|---|---|---|
| PS mixture C-type heavy oil: | ▲ | ○ | ⊙⊙ | ⊙ | ○ | ● |

▲: Black smoke caused by soot and coke is generated. Flammability is bad.
●: Black smoke is generated little, but the combustion rate is low and unburned combustibles remain.
○: Almost favorable. Unburned combustibles partly remain. There is variation in combustion rate.
⊙⊙: Best combustibility. The combustion ash condition is very good, and sintering and melting can be seen.
⊙: Satisfactory. Little unburned combustibles. A combustion rate is stabilized.

The above table unexpectedly has shown that the less water content, the better combustibility is not always obtainable, but that the combustibility is more satisfactory with a certain degree of water content. Presumably, this is because hydrogen and carbon monoxide are generated by generation of water gas reaction.

As explained above, according to the present invention, the paper sludge is formed into moldable paste by adding a prescribed amount of liquid fuel oil while kneading it, returning the combustion residue to the kneading device, and kneading the paper sludge further, and also since said paste is formed into a prescribed form, for example, a bar-like form and the water content of said moldings is adjusted by the humidity conditioning furnace at the time of burning said moldings, the organic substances (cellulose or the like) are burned almost perfectly. Consequently, the present invention has the advantage of being able to produce combustion ash of good quality without generating the combustion residue such as graphite and black smoke.

What is claimed are:

1. A system for producing combustion ash of cellulose-containing wastes, comprising a kneading device for kneading cellulose-containing wastes with a given quantity of liquid fuel oil, a fuel tank for storing said fuel oil and supplying the fuel oil to said kneading device, a molding device for molding said mixture, into moldings and a combustion furnace for burning said moldings, wherein a humidity conditioning furnace for adjusting water content of said moldings to 30–50% by weight is arranged between said molding device and said combustion furnace.

2. The system for producing combustion ash of cellulose-containing wastes as claimed in claim 1, wherein a solids content of said cellulose-containing wastes has cellulose 97–35% by weight and inorganic matter 3–65% by weight, and has a water content of 50–75%, referring to the total weight of said cellulose-containing wastes.

3. The system for producing combustion ash of cellulose-containing wastes as claimed in the claim 1 or 2, wherein the kinematic viscosity of the fuel oil is less than 50–170 cSt. at 50° C.

4. The system for producing combustion ash of cellulose-containing wastes as claimed in claim 1 or 2, wherein a weight ratio of the fuel oil to the cellulose-containing wastes, ie., fuel oil: solid portion of the cellulose-containing wastes is equal to 1:1.5–1:1.9.

5. The system for producing combustion ash of cellulose-containing wastes as claimed in claim 1 or 2, where combustion residue containing unburned combustibles (including combustion ash) produced in said combustion furnace is made to return to the kneading device.

6. The system for producing combustion ash of cellulose-containing wastes as claimed in claim 1 or 2, wherein a temperature of said humidity conditioning furnace is made to be adjustable by using exhaust gas of said combustion furnace.

7. The system for producing combustion ash of cellulose-containing wastes as claimed in claim 1 or 2, wherein a pre-heater is arranged for performing heat exchange between an exhaust gas of said combustion furnace and air for combustion.

8. The system for producing combustion ash of cellulose-containing wastes as claimed in claim 1 or 2, wherein said combustion furnace is provided with a boiler and heat generated by the boiler is utilized for generating electric power.

9. The system for producing combustion ash of cellulose-containing wastes as claimed in claim 1 or 2, wherein a calcium compound is thrown down in said kneading device.

* * * * *